United States Patent
Andrasko et al.

(10) Patent No.: US 10,343,758 B2
(45) Date of Patent: Jul. 9, 2019

(54) SYSTEMS AND METHODS FOR CONTROLLING VESSEL SPEED WHEN TRANSITIONING FROM LAUNCH TO CRUISE

(71) Applicant: Brunswick Corporation, Lake Forest, IL (US)

(72) Inventors: Steven J. Andrasko, Oshkosh, WI (US); Andrew J. Przybyl, Berlin, WI (US); Steven M. Anschuetz, Fond du Lac, WI (US)

(73) Assignee: Brunswick Corporation, Mettawa, IL (US)

( * ) Notice: Subject to any disclaimer, the term of this patent is extended or adjusted under 35 U.S.C. 154(b) by 365 days.

(21) Appl. No.: 15/252,911

(22) Filed: Aug. 31, 2016

(65) Prior Publication Data

US 2018/0057133 A1    Mar. 1, 2018

(51) Int. Cl.
  *B63H 21/21*    (2006.01)
  *B63J 99/00*    (2009.01)

(52) U.S. Cl.
  CPC ........... *B63H 21/21* (2013.01); *B63J 99/00* (2013.01); *B63H 2021/216* (2013.01); *B63J 2099/008* (2013.01); *Y02T 70/742* (2013.01)

(58) Field of Classification Search
  CPC ...... B63H 21/21; B63J 99/00; B63J 2099/008
  USPC ......................................................... 701/21
  See application file for complete search history.

(56) References Cited

U.S. PATENT DOCUMENTS

| 7,214,110 | B1 * | 5/2007 | Ehlers | B63H 21/14 440/1 |
| 7,361,067 | B1 | 4/2008 | Smedema | |
| 8,145,371 | B2 * | 3/2012 | Rae | B63H 11/107 701/21 |
| 9,145,839 | B1 | 9/2015 | Andrasko | |
| 2006/0038977 | A1 * | 2/2006 | Williams | F41G 7/226 356/28.5 |
| 2006/0074558 | A1 * | 4/2006 | Williamson | G01C 21/165 701/469 |
| 2017/0130835 | A1 * | 5/2017 | Zhang | F16H 9/18 |

FOREIGN PATENT DOCUMENTS

| JP | 2012087808 A | 5/2012 | |
| WO | WO-2017095235 A1 * | 6/2017 | B63B 9/00 |

OTHER PUBLICATIONS controlguru.com, "PID Control and Derivative on Measurement," webpage article, posted Apr. 7, 2015, http://controlguru.com/pidcontrolandderivativeonmeasurement/, website last visited Aug. 12, 2016.

* cited by examiner

*Primary Examiner* — Anne M Antonucci
*Assistant Examiner* — James E Stroud
(74) *Attorney, Agent, or Firm* — Andrus Intellectual Property Law, LLP (57) ABSTRACT

A method for controlling a speed of a marine vessel includes accelerating the marine vessel in response to a launch command. The method then includes holding the vessel speed at a desired vessel speed with a controller using feedback control. The controller phases in a derivative term of the feedback control in response to determining that the following conditions are true: (a) the vessel speed is within a given range of the desired vessel speed; and (b) an acceleration rate of the marine vessel is less than a given value.

20 Claims, 6 Drawing Sheets

| LEVEL | RATE (ΔKPH/SEC) | % OVERSHOOT | DURATION (SECONDS) |
|---|---|---|---|
| 1 | 1.0 | 0 | 0 |
| 2 | 2.0 | 5 | 2.5 |
| 3 | 3.0 | 10 | 3.0 |
| 4 | 3.5 | 15 | 3.5 |
| 5 | 4.0 | 20 | 4.0 |

SYSTEMS AND METHODS FOR CONTROLLING VESSEL SPEED WHEN TRANSITIONING FROM LAUNCH TO CRUISE

FIELD

The present disclosure relates to system and methods for controlling speed of a marine vessel propelled by a marine propulsion system.

BACKGROUND

U.S. Pat. Nos. 7,214,110 and 7,361,067, which are incorporated herein by reference, disclose acceleration control systems that allow the operator of a marine vessel to select an acceleration profile to control the engine speed of a marine vessel from an initial starting speed to a final desired speed. When used in conjunction with tow sports, such as wake boarding and water skiing, the use of acceleration profile provides consistent performance during the period of time when a water skier is accelerated from a stationary position to a full speed condition.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one example of the present disclosure, a method for controlling a speed of a marine vessel includes accelerating the marine vessel in response to a launch command. The method then includes holding the vessel speed at a desired vessel speed with a controller using feedback control. The controller phases in a derivative term of the feedback control in response to determining that the following conditions are true: (a) the vessel speed is within a given range of the desired vessel speed; and (b) an acceleration rate of the marine vessel is less than a given value.

In another example of the present disclosure, a method for controlling a speed of a marine vessel as a propulsion controller of the marine vessel transitions from a launch mode to a cruise control mode is disclosed. The method includes determining when the propulsion controller has transitioned from the launch mode to the cruise control mode and determining when an acceleration rate of the marine vessel is less than a given value. In response to the propulsion controller transitioning from the launch mode to the cruise control mode and the acceleration rate being less than the given value, the method includes phasing a derivative term into a feedback control algorithm that the propulsion controller uses to control the vessel speed in the cruise control mode. Thereafter, the method includes maintaining a desired speed of the marine vessel in the cruise control mode with the propulsion controller.

A system for controlling a speed of a marine vessel is also disclosed in one example. A first feedback controller controls the vessel speed while the marine vessel is accelerating according to a launch mode. A second feedback controller controls the vessel speed while the marine vessel is maintaining a desired speed according to a cruise control mode. A propulsion device accepts inputs from the first and second feedback controllers and operates according to the inputs so as to propel the marine vessel in the launch mode or the cruise control mode, respectively. The second feedback controller phases in a derivative term in response to a determination that the system has transitioned from the launch mode to the cruise control mode and that an acceleration rate of the marine vessel is less than a given value.

BRIEF DESCRIPTION OF THE DRAWINGS

Examples of systems and methods for controlling a marine vessel are described with reference to the following Figures. The same numbers are used throughout the Figures to reference like features and like components.

DETAILED DESCRIPTION

In the present description, certain terms have been used for brevity, clarity, and understanding. No unnecessary limitations are to be implied therefrom beyond the requirement of the prior art because such terms are used for descriptive purposes only and are intended to be broadly construed. The different systems and methods described herein may be used alone or in combination with other systems and methods. Various equivalents, alternatives, and modifications are possible within the scope of the appended claims. Each limitation in the appended claims is intended to invoke interpretation under 35 USC § 112(f), only if the terms "means for" or "step for" are explicitly recited in the respective limitation.

Figure 1:
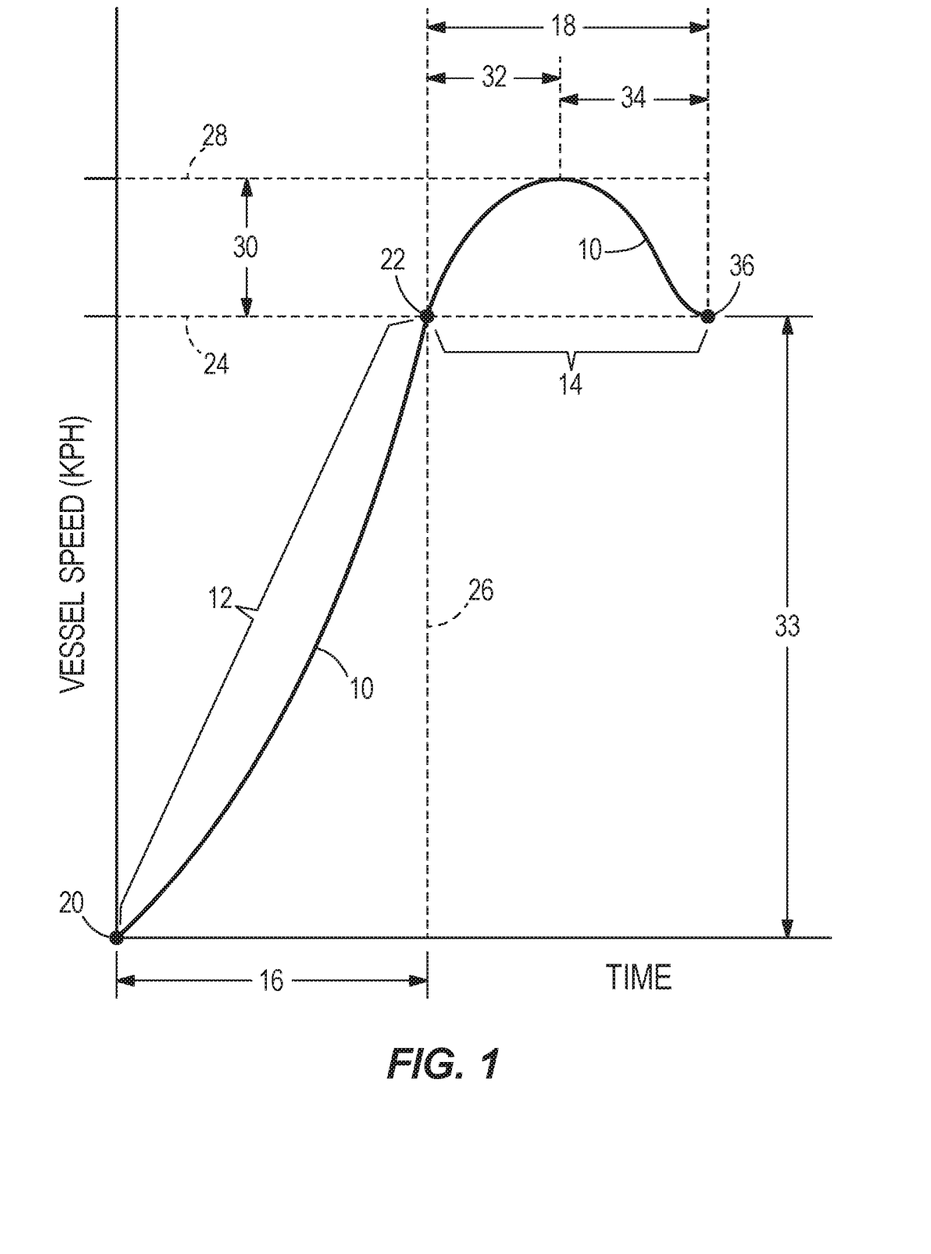
FIG. 1 illustrates an exemplary acceleration profile according to the present disclosure.

FIG. 1 is a graphical representation of an exemplary acceleration profile 10 for a marine vessel. The acceleration profile 10, illustrated as vessel speed as a function of time, comprises a first segment 12 and a second segment 14. The first segment 12 is associated with a first period of time 16 and the second segment 14 is associated with a second period of time 18. The first segment 12 of the acceleration profile 10 extends from an initial vessel speed 20 to a vessel speed 22 which is substantially equal to a desired vessel speed, or final vessel speed, which is represented by dashed line 24. The first segment 12 of the acceleration profile 10 corresponds to a launch mode of the marine vessel and its propulsion controller. The second segment 14 of the acceleration profile 10 extends from that desired vessel speed, at point 22, which occurs at the end of the first period of time 16 represented by dashed line 26, to a speed that is somewhat greater than the desired final speed 24. This greater vessel speed is identified by dashed line 28 in FIG. 1. The greater speed 28 is of a greater magnitude than the desired final vessel speed 24 by a preselected magnitude illustrated by dimension 30. It can be seen that the second segment 14 can comprise an acceleration portion during the time period identified by arrow 32, and a deceleration portion during the time period represented by arrow 34. Both the acceleration portion and the deceleration portion occur during the second period of time 18. After the second period of time 18, which ends at point 36, the vessel speed can be held at the desired final vessel speed 24 for as long as the operator wishes to cruise at that speed. Thus, the time period from dashed line 26 on corresponds to a cruise control mode of the marine vessel and its propulsion controller.

Figure 2:
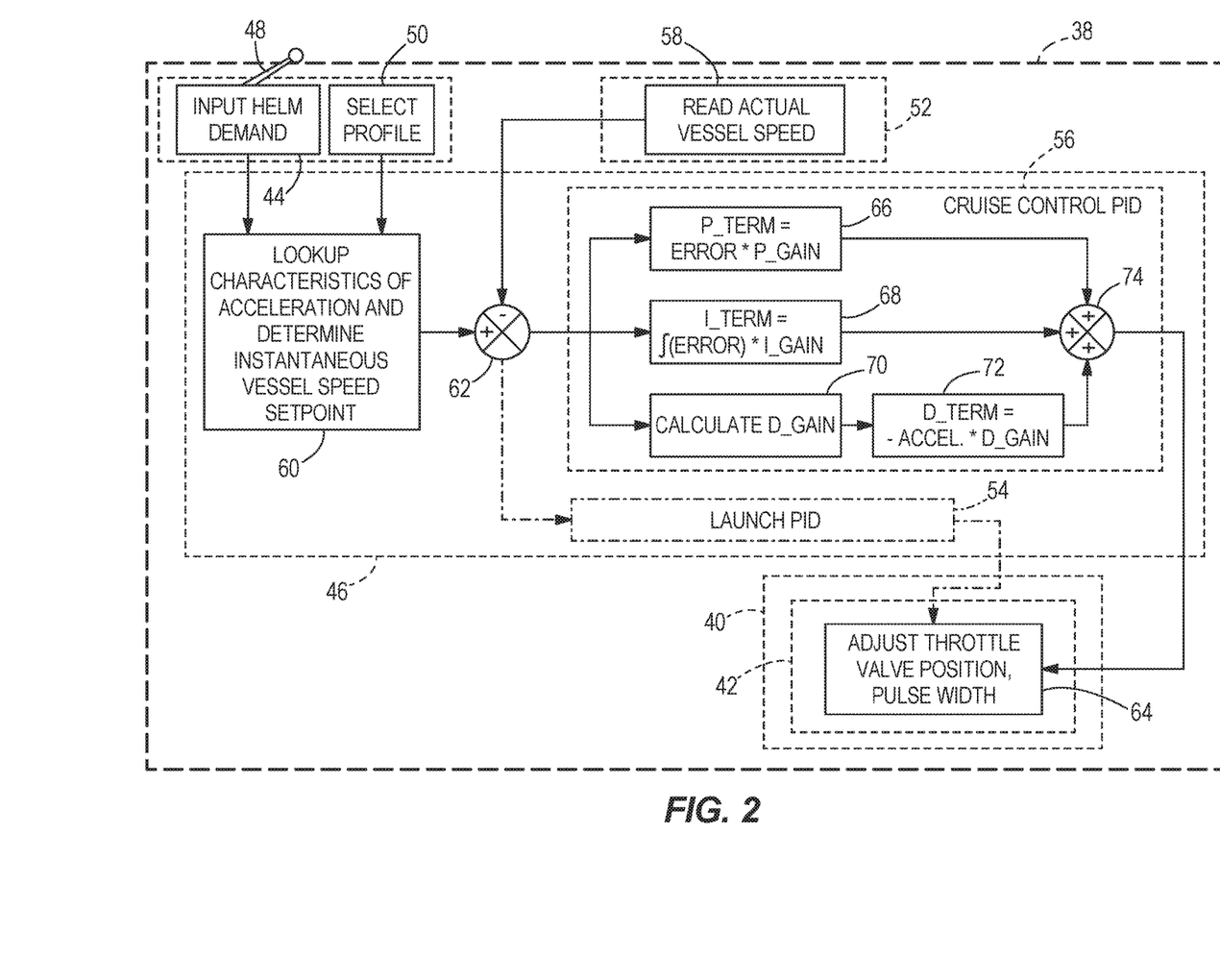
FIG. 2 illustrates a schematic of a system for carrying out the method of the present disclosure.

FIG. 2 is a schematic representation of the environment in which one example of the present disclosure can typically be used. Dashed line box 38 represents a marine vessel in which a marine propulsion device 40, including an engine 42, provides marine propulsion for the vessel 38. A manually controllable throttle mechanism 44 allows the operator of the marine vessel to control the vessel speed by way of controlling the operating speed of the engine 42. A propulsion controller 46, such as an engine control module, controls the operating speed of the engine 42 in conformance with signals received from the position of a throttle handle 48 of the manually controllable throttle mechanism 44. Also shown in FIG. 2 is a control panel 50 which allows the operator of the marine vessel 38 to provide additional information to the controller 46. A GPS device 52, which provides geographical location signals to the controller 46, is also provided on the marine vessel 38. The GPS device 52 may also provide a reading of speed over ground (SOG) to the controller 46, calculated as distance covered in a given period of time, which constitutes one measurement of vessel speed. However, it should be understood that the GPS device 52 is not required in all embodiments of the present disclosure and that a speedometer, pitot tube, paddlewheel, etc. are alternatives for measuring vessel velocity.

With reference to FIGS. 1 and 2, the control panel 50 allows the operator of the marine vessel to select an acceleration profile, typically from a portfolio of potential profiles, and provides that selection to the controller 46 for future application when a start command signal is received. A start command may be received by the controller 46 from the manually controllable throttle mechanism 44. The start command can be initiated by the sudden movement of the throttle handle 48 from a neutral position or idle speed position to a higher speed command, such as maximum speed or near maximum speed.

With continued reference to FIGS. 1 and 2, several characteristics of one example of the present disclosure can be observed. For example, the first segment 12 of the acceleration profile 10, during the first time period 16, is generally constant. The graphical representation in FIG. 1 shows this first segment 12 as representing a slightly increasing acceleration rate as the vessel speed changes from point 20 to point 22. However, this acceleration rate can be much more constant than is shown in FIG. 1. In other words, the first segment 12 of the acceleration profile can be virtually a straight line extending between points 20 and 22. After the expiration of the first period of time 16, an overshoot condition is intentionally provided, but is not necessary. After achieving the desired final vessel speed 24, at point 22, the vessel speed is increased beyond that desired vessel speed 24 to achieve the overshoot represented by dimension 30. This results in the achievement of the speed represented by dashed line 28. This continued acceleration occurs in the time period identified by arrow 32. Then, according to a preselected procedure, the vessel speed is decelerated during time period 34 to the desired final vessel speed 24, which is achieved at point 36 in FIG. 1.

Figure 3:
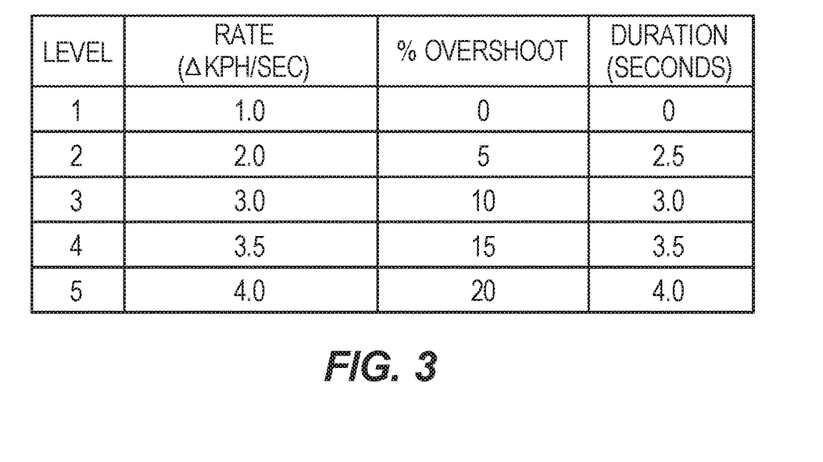
FIG. 3 is an exemplary table showing parameters for overshooting a desired vessel speed according to exemplary acceleration profiles.

The information relating to the acceleration profile, in one example, is represented by three parameters for each of five potential acceleration profiles. Exemplary information, which is not limiting on the scope of the present disclosure, is shown in FIG. 3. In this exemplary table of FIG. 3, five skill levels are represented. For each level, the rate of acceleration, represented as $\Delta$ KPH/second, is stored along with an associated percentage overshoot magnitude. The percentage overshoot magnitude is equivalent to the percentage of the magnitude represented by dimension 30 in FIG. 1 to the magnitude represented by arrow 33 in FIG. 1. If the final desired vessel speed is 20 KPH, for example, the level three profile in FIG. 3 would prescribe a 10% overshoot, or 2 KPH, which would be the difference represented by dimension 30 in FIG. 1. In FIG. 3, the overshoot duration for each level is also stored. The overshoot duration represents the magnitude of arrow 18, measured in seconds, for each of the acceleration profiles. Here, for a level three profile, the overshoot would last for 3.0 seconds. Using the control panel 50, the operator of the marine vessel would select a profile (e.g., 1-5) prior to providing the start signal, which, as noted above, occurs when the operator rapidly moves the manually operated throttle handle 48 from an initial speed position to a higher speed position. Note that the table shown in FIG. 3 is not the only way to program acceleration profiles into the memory of the controller 46, and equations or other types of input-output maps could be used.

Figure 4:
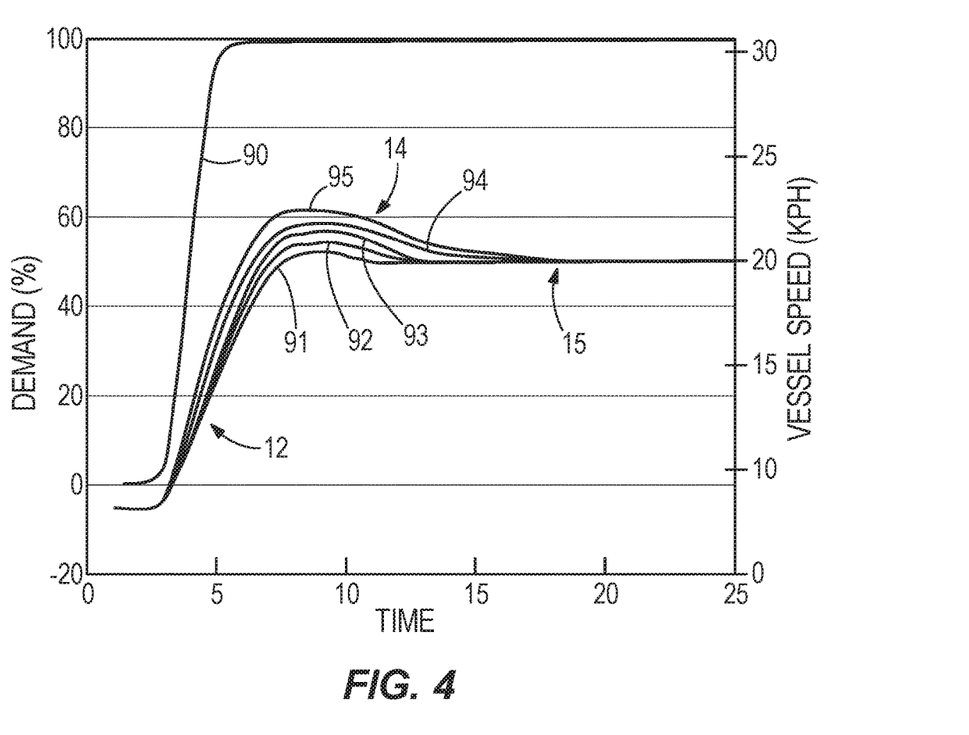
FIG. 4 illustrates several exemplary acceleration profiles.

FIG. 4 is a graphical representation of several acceleration profiles. Line 90 represents the position of the throttle handle 48, measured with respect to the left axis, as a percentage of a maximum vessel speed command. In addition, five acceleration profiles are shown with respect to the right axis in FIG. 4. As shown, this particular embodiment of the present disclosure responds to a rapid movement of the throttle handle 48, as represented by line 90, from a zero speed command to a 100% speed command in a relatively short period of time. When this rapid movement of the throttle handle 48 is detected by the controller 46, one of the illustrated acceleration profiles is followed. It should be understood that although five profiles are shown simultaneously in FIG. 4, only one profile would be applied, according to the operator's prior selection via the control panel 50. In FIG. 4, acceleration profile 91 conforms generally to the level one profile in FIG. 3, acceleration profile 92 in FIG. 4 conforms generally to the level two profile shown in FIG. 3, and so on.

As can be seen, each acceleration profile 91-95 comprises the initial acceleration portion, or first segment 12, corresponding to vessel launch; an optional overshoot portion, or second segment 14, corresponding to the beginning of vessel cruise control; and a steady state portion, or third segment 15, corresponding to continuation of vessel cruise control. The overshoot portion is perceived by the operator as a more robust or aggressive start from a stationary position to an "on plane" position or to a "mushing" position (between on-plane and off-plane). This is a result of the vessel speed lagging behind the engine speed due to the load imposed by the marine vessel 38. As shown in FIG. 4, all five acceleration profiles 91-95 begin at the same initial vessel speed and end by cruising at the same desired final vessel speed, but vary significantly with respect to the acceleration rate of the first segment 12 and the overshoot of the second segment 14.

The processes by which the controller 46 shown in FIG. 2 controls the vessel speed can vary from application to application. In a typical application, during the first segment 12 of the acceleration profile and subsequent to a start command, the controller 46 would repeatedly schedule the velocity ramp by increasing the opening of the throttle plate of the engine 42. Adjustments to the rate of throttle plate movement would be made as a function of the launch intensity level (Δ KPH/second). This function would continuously be performed during the first segment 12 of the acceleration profile. Then, after determining the desired percentage of optional overshoot for the second segment 14 of the acceleration profile, for example using the table of FIG. 3, the controller 46 would perform a generally similar function in order to achieve the desired shape of the acceleration profile, as discussed above in conjunction with FIG. 1. Alternatively, the controller 46 could vary the fuel injected into the cylinders of the engine 42, such as in a direct injection engine, to achieve the desired vessel speed at each instant during the time period of the acceleration profile. It should be understood that those skilled in the art of engine control have many alternative processes that are well known for controlling the vessel speed at any particular instant in time. These processes can be performed at each instant in time over the time period of the acceleration profile to achieve the desired acceleration profile.

Referring again to FIG. 2, as mentioned herein above, the system of the present disclosure includes a controller 46. The controller 46 may include a computing system that includes a processing system, storage system, software, and input/output (I/O) interfaces. The processing system loads and executes software from the storage system, including a vessel launch software application module. When executed by the computing system, the vessel launch software application module directs the processing system to operate as described herein to execute a vessel launch method.

The computing system may include one or many application modules and one or more processors, which may be communicatively connected. The processing system can comprise a microprocessor and other circuitry that retrieves and executes software from the storage system. Processing system can be implemented within a single processing device but can also be distributed across multiple processing devices or sub-systems that cooperate in existing program instructions. Non-limiting examples of the processing system include general purpose central processing units, applications specific processors, and logic devices.

The storage system can comprise any storage media readable by the processing system and capable of storing software. The storage system can include volatile and non-volatile, removable and non-removable media implemented in any method or technology for storage of information, such as computer readable instructions, data structures, program modules, or other data. The storage system can be implemented as a single storage device or across multiple storage devices or sub-systems. The storage system can further include additional elements, such as a controller capable of communicating with the processing system. Non-limiting examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to store the desired information and that may be accessed by an instruction execution system. The storage media can be a non-transitory or a transitory storage media.

Still referring to FIG. 2, the vessel launch software application module(s) may include a first feedback controller 54 controlling vessel speed while the marine vessel 38 is accelerating according to the launch mode and a second feedback controller 56 controlling vessel speed while the vessel is maintaining a desired speed according to the cruise control mode. The first and second feedback controllers 54, 56 can be separate from the controller 46, or can be control sections within the controller 46. In another example, the feedback controllers 54, 56 are not different components or separate control sections at all, but are stored as software code in the memory of the controller 46 that is programmed to execute one feedback control algorithm or another depending on existing conditions. Each of the first and second feedback controllers 54, 56 can use a different feedback control algorithm to control vessel speed. For instance, if the feedback control algorithm is a proportional-integral-derivative (PID) control algorithm, the PID gains and/or limits for each feedback controller 54, 56 could be different. A propulsion device 40 accepts inputs from the first and second feedback controllers 54, 56 and operates according to the inputs so as to propel the marine vessel 38 in the launch mode or the cruise control mode, respectively. The use of different control parameters from two different feedback controllers 54, 56 is helpful because when the marine vessel 38 is accelerating, the propeller is not hooked up (i.e., is slipping), and the load and change in load on the marine vessel 38 are therefore very different than when the marine vessel 38 is holding its speed in cruise control mode. Using first and second PID feedback controllers 54, 56 with different control parameters allows for separate calibration of each controller, which in turn allows for customized control over the transient conditions encountered during launch and customized control over the relatively steady-state conditions encountered while in cruise control mode. In another example, only one feedback controller is used for controlling the vessel in both the launch and cruise control modes, and a derivative term is not phased in until certain conditions are true, which conditions will be described in more detail herein below.

Figure 5:
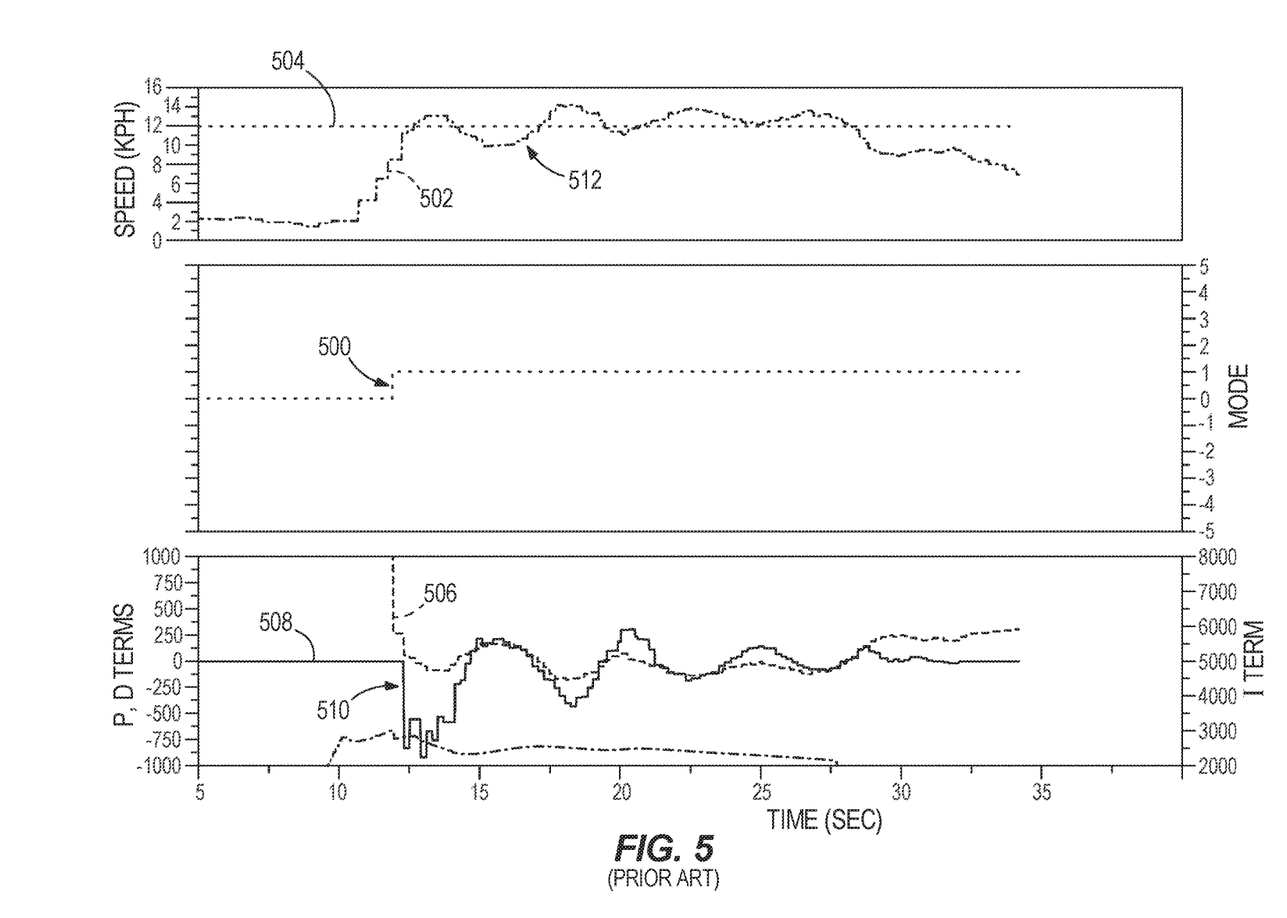
FIG. 5 illustrates charts plotting acceleration of a marine vessel according to a prior art method.

Through research and development, the present inventors discovered that a derivative term was not necessary for PID control during launch of a marine vessel 38, because the stability and dampening effect of a derivative term are not required during transient conditions. In contrast, a derivative term was necessary while in the cruise control mode, in order to dampen the overshoot and undershoot effects of the proportional term caused by a time lag between an increase in engine speed and a responsive increase in vessel speed. However, the present inventors realized that when the system transitions from the launch mode to the cruise control mode, the immediate presence of a derivative term from the second feedback controller 56 caused setpoint jumps and instability. For example, FIG. 5 shows a plot of vessel speed versus time in the top chart, a plot of mode versus time in the middle chart (where 0=launch mode, and 1=cruise control mode), and a plot of PID terms versus time in the bottom chart. At about 12 seconds, according to a predetermined method, the mode switches from launch to cruise control (0 to 1), as shown at arrow 500. Because at this time the actual speed of the vessel, shown at 502, is below the desired vessel speed, shown at 504, the P-term 506 starts out positive and falls to zero as vessel speed approaches the setpoint. The D-term 508, however, drops almost immediately after the mode transitions, as shown by the step change at arrow 510, due to the rate of acceleration towards the setpoint, reducing the output from the engine, creating a rapid deceleration and short duration overshoot, driving instability in the second feedback controller 56. However, this causes the actual vessel speed 502 to undershoot the desired vessel speed 504, as shown at 512. Starting at about 15 seconds, the P-term 506 and D-term 508 thereafter chase one another in an attempt to achieve the desired vessel speed 504, causing continual overshoot and undershoot thereof.

Therefore, the present inventors developed an algorithm for phasing in the derivative term to prevent such step changes and over/undershoot of the desired vessel speed. The algorithm phases in the derivative term only once the actual vessel speed comes within a given range of the desired vessel speed. The present inventors combined this criterion with a requirement that the vessel's acceleration rate be less than a given value before the derivative term would be phased in, thereby further decreasing the likelihood of a step change that could be felt by the operator. As will be described further herein below, the second feedback controller 56 therefore phases in a derivative term of its PID control in response to a determination that (a) the system has transitioned from the launch mode to the cruise control mode, and that (b) an acceleration rate of the marine vessel 38 is less than a given value.

Figure 6:
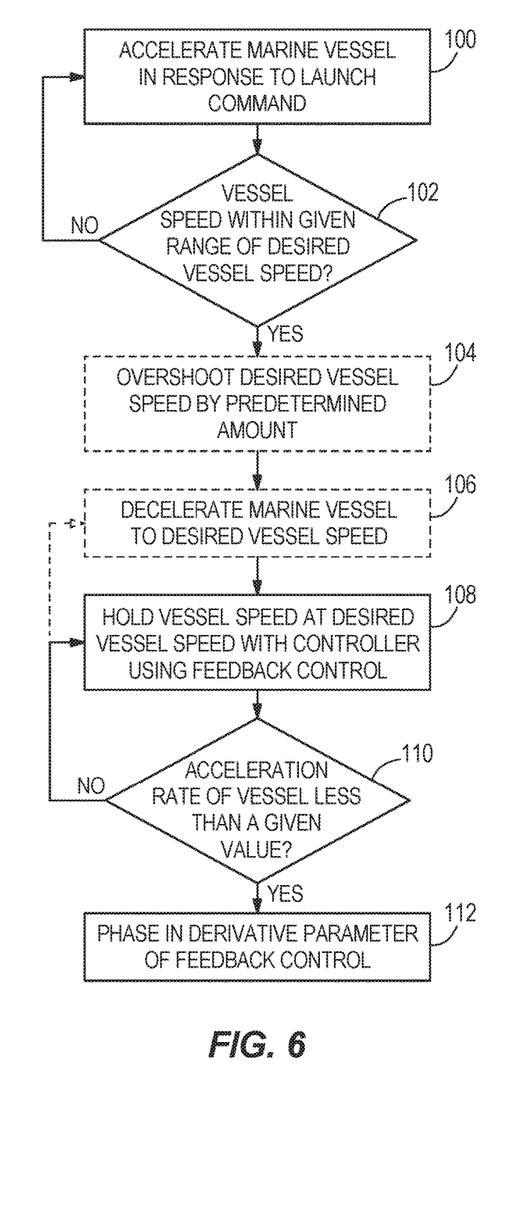
FIG. 6 shows one example of a method for accelerating a marine vessel according to the present disclosure.

Referring to FIG. 6, a method for controlling a speed of a marine vessel includes, as shown at 100, accelerating the marine vessel in response to a launch command. The launch command can be generated as described above, such as when an operator moves the throttle handle 48 forward suddenly, and may require that a given acceleration profile is selected beforehand via the control panel 50. Next, as shown at 102, the method includes determining if the vessel speed is within a given range of a desired (target) vessel speed. If NO, the method returns to box 100, because the vessel speed must increase more before it comes within the given range of the desired vessel speed. If YES at box 102, the method optionally includes overshooting the desired vessel speed by a predetermined amount, as shown at 104. As shown at 106, the method then optionally includes decelerating the marine vessel to the desired vessel speed. Steps 104 and 106 are accomplished as described herein above with respect to FIGS. 1, 3, and 4. Note that if an overshoot condition is not provided, the vessel speed is instead accelerated directly to the desired vessel speed. Thereafter, the method includes holding the vessel speed at the desired vessel speed with a controller using feedback control, as shown at box 108. Referring briefly to FIG. 2, the marine vessel 38 is now in the cruise control mode, in which the controller 46 uses a difference between a measured vessel speed (see box 58) and the desired vessel speed (see box 60) to calculate control parameters used by the second feedback controller 56.

Returning to FIG. 6, the controller 46 also determines whether an acceleration rate of the marine vessel is less than a given value, as shown at 110. If YES, the controller 46 phases in a derivative term of the feedback control, as shown at 112. If the determination at 110 is NO, the method may return to box 106 if the overshoot condition was provided or to box 108 if it was not, seeing as the engine speed must decrease more before it will result in a change in vessel speed (i.e., acceleration) that is less than the given value.

Regarding the first condition at 102, in one example, the given range (within which the actual vessel speed must be of the desired vessel speed) varies proportionately with a magnitude of the desired vessel speed. For example, the given range may be anywhere from 0 KPH to 10 KPH. By way of illustration, a vessel operating at a level 1 acceleration profile might be required to reach the desired vessel speed (i.e., be within a given range of 0 KPH from the desired vessel speed) before the first condition for phasing in the derivative term is met. On the other hand, because vessel speed lags farther behind engine speed for higher desired speed setpoints, a level 5 acceleration profile might require that actual vessel speed is only within 10 KPH of the desired vessel speed before the first condition is met, in order to prevent massive overshoot. Levels 2-4 would be associated with given ranges between, in this example, 0 KPH and 10 KPH.

Regarding the second condition at 110, in one example, the acceleration rate of the vessel is a measured value. For example, the acceleration rate can be calculated as a derivative of a speed-over-ground reading from the GPS device 52. In other examples, acceleration can be calculated as the derivative of the speed reading from a speedometer or other speed measuring device. In one example, the given value (below which the acceleration rate must drop before the second condition is met) is substantially zero, such that the second condition goes true at a time that very closely approximates when the vessel stops accelerating to create the overshoot and begins decelerating toward the desired vessel speed. For example, the given value may be 0.05 KPH/sec±10%. In another example, in which launch acceleration rates range from 1 KPH/sec to 4 KPH/sec, the given value may range from about 1% to about 5% of the launch acceleration rate, and may be calibrated to match a given acceleration profile. Because the algorithm waits until the acceleration rate transitions through substantially 0 KPH/sec, this ensures that the derivative term also starts from zero, preventing a step change that would otherwise occur in response to a steep change in acceleration rate.

Note that generally, the vessel speed will come within the given range of the desired vessel speed before the acceleration rate is less than the given value. This is because the acceleration profiles are programmed such that the vessel will reach and overshoot the desired vessel speed before decelerating back to the desired vessel speed. Thus, the two conditions for phasing in the derivative term may not go true simultaneously. However, if the vessel is overloaded, it may not be able to reach the desired vessel speed, in which case the launch algorithm may be programmed in one of several ways to nonetheless allow the derivative term to be phased in. For example, the given range can be calibrated such that it ranges far enough from the desired vessel speed that the actual vessel speed will be within the given range of the setpoint by the time the vessel is incapable of further acceleration. In another example, once the controller 46 determines that the vessel is incapable of further acceleration, it may set the first determination to true, perhaps by temporarily expanding the given range around the setpoint, in order to allow the system to transition from the launch mode to the cruise control mode.

The controller 46 can phase in the derivative term in different ways. In one example, the second feedback controller 56 ramps in the derivative term at a predetermined rate. In other words, the second feedback controller 56 may ramp in the derivative term in calculated increments. This could be done by ramping in the derivative gain at a predetermined rate before multiplying the full derivative gain by the derivative of the error. For example, if the total derivative gain calculated by the second feedback controller 56 is 100, and the calibration ramp rate is set to 10, it will take 10 time stamps to ramp up to the full value of 100. The second feedback controller 56 will ramp the derivative gain from 0 to 10 to 20 to 30, etc. during each time stamp, before multiplying the full derivative gain by the derivative of the error to determine the derivative term. This then adds in only a portion of the derivative term every time stamp, providing damping that prevents a step change. A step change can further be prevented by the second feedback controller 56 ramping in the derivative gain from substantially zero to the full derivative gain. In some examples, the derivative gain can be ramped in non-linearly. In some examples, the derivative term can be rate-limited, as opposed to the derivative gain being rate-limited. Note that in any case, damping of the derivative term helps damp the delay in response between a change in engine speed and a resulting change in vessel speed.

Figure 7:
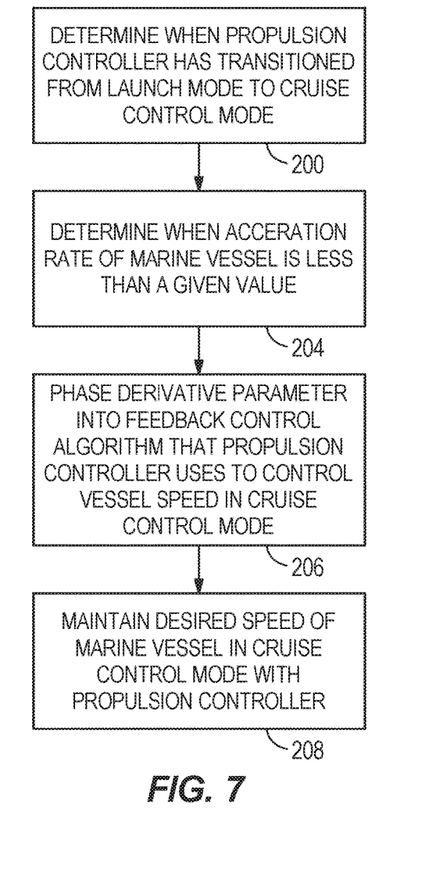
FIG. 7 shows another example of a method for accelerating a marine vessel according to the present disclosure.

As shown in FIG. 7, another method for controlling a speed of a marine vessel 38 as a propulsion controller 46 of the marine vessel 38 transitions from a launch mode to a cruise control mode is disclosed. The method includes determining when the controller 46 has transitioned from the launch mode to the cruise control mode, as shown at 200. For example, the controller 46 may transition from the launch mode to the cruise control mode when the vessel speed is within a given range of the desired vessel speed. As noted hereinabove, the given range may vary proportionately with a magnitude of the desired vessel speed. As shown at 204, the method may also include determining when an acceleration rate of the marine vessel 38 is less than a given value. In one example, as described hereinabove, the given value is substantially zero.

In response to the controller 46 transitioning from the launch mode to the cruise control mode and the acceleration rate being less than the given value, the method may include phasing a derivative term into a feedback control algorithm that the controller 46 uses to control the vessel speed in the cruise control mode, as shown at 206. In one example, the method comprises ramping the derivative term into the feedback control algorithm at a predetermined rate with the controller 46, as described hereinabove. The method may also include setting the derivative term to substantially zero in response to the controller 46 transitioning from the launch mode to the cruise control mode and before phasing in the derivative term. This will prevent a step change, as noted herein above. As shown at 208, the method may include thereafter maintaining a desired speed of the marine vessel 38 in the cruise control mode with the controller 46. Also as noted hereinabove, the controller 46 may use a first feedback control algorithm while in the launch mode to control acceleration of the vessel and a second, different feedback control algorithm while in the cruise control mode to hold the vessel speed at the desired vessel speed.

Once the controller 46 determines that the marine vessel 38 is in the cruise control mode, the controller 46 may use gain scheduling, in which one or more of the proportional, integral, and derivative terms is varied proportional to the calculated error. This allows for more tailored control over the vessel speed while holding the vessel speed, with less overshoot or undershoot and less steady state error.

Therefore, referring back to FIG. 2, a system according to the present disclosure will accept an input regarding a selected acceleration profile for launch of the marine vessel via the control panel 50. The controller 46 will then receive a start command in response to sudden movement of the throttle handle 48 at manually controllable throttle mechanism 44. The controller 46 will then lookup characteristics of the appropriate acceleration profile as shown at box 60, including the desired vessel speed, the acceleration rate, the optional overshoot, and the overshoot duration. In one example, the desired final vessel speed may be a maximum vessel speed corresponding to 100% movement of the throttle lever. In another example, the desired final vessel speed may correspond to an ending position of the throttle handle 48 that is less than 100% movement. As noted hereinabove, the acceleration rate, the overshoot, and the overshoot duration can be determined using a table such as that shown in FIG. 3. Once the desired vessel speed is known, this value is passed to a summer 62. Meanwhile, a GPS device 52 may read the actual vessel speed, as shown at box 58, which is also passed to the summer 62.

The difference between the desired and actual vessel speeds determined by summer 62 is passed to the launch PID controller (first feedback controller) 54 while the marine vessel 38 is operating in the launch mode. The output of the first feedback controller 54 is used to adjust a throttle position and/or pulse width of fuel injection at the engine 42, as shown at box 64. The actual vessel speed as read by the GPS device 52 will then change in response to the change in engine speed, the instantaneous setpoint vessel speed will increase according to the acceleration rate determined from the table in FIG. 3, and the first feedback controller 54 will recalculate adjustments to the engine's operating characteristic(s). This is accomplished via known PID control techniques until the vessel speed comes within the given range of the desired vessel speed. For example, referring now to FIG. 8, such control results in the actual vessel speed 800 approaching the desired vessel speed 802 as the vessel accelerates by between about 1-2 KPH/sec as shown by line 810, and as the proportional term 804 and integral term 806 provide corrective action. The derivative term 808 remains at zero during this time, seeing as damping is not needed during this transient condition.

Figure 8:
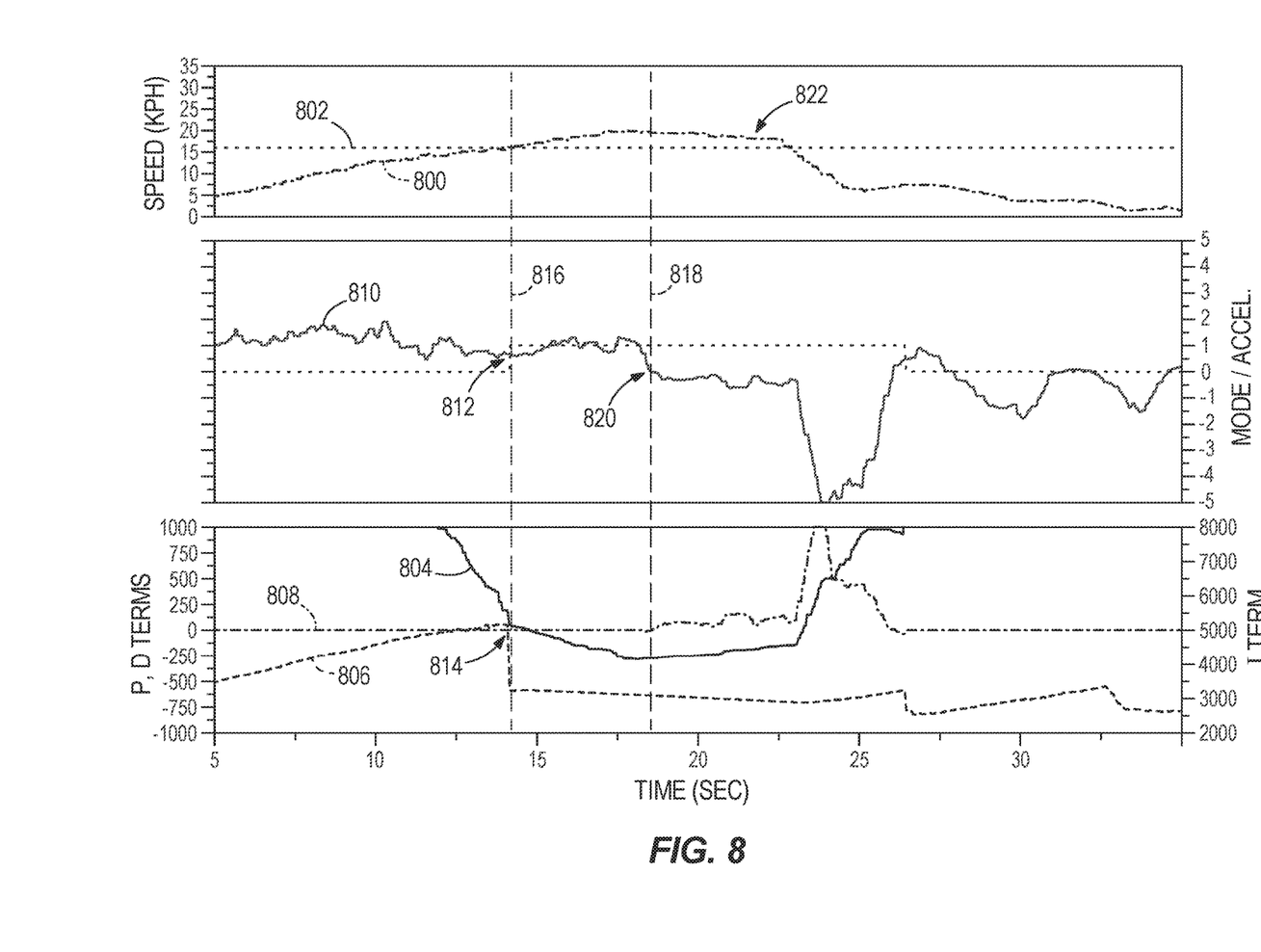
FIG. 8 illustrates charts plotting acceleration of a marine vessel according to a method of the present disclosure.

At dashed line 816 in FIG. 8, which corresponds to about 14 seconds, the actual vessel speed 800 as read by the GPS device 52 comes within the given range of the desired vessel speed 802. Here, the given range is zero, and the condition goes true when the actual vessel speed 800 is equal to the desired vessel speed 802. The controller 46 therefore determines that the mode has switched from launch to cruise control, as indicated by the mode switch from 0 to 1 at arrow 812. Referring to both FIGS. 2 and 8, the controller 46 thereafter switches to providing output from the summer 62 to the second feedback controller 56. The error from summer 62 is provided to box 66, where it is multiplied by a proportional gain to determine the P-term 804, which is a decreasing negative number in order to accelerate the vessel according to the prescribed overshoot parameters. The accumulated error is provided to box 68, where it is multiplied by the integral gain to determine the I-term 806, which has been reset to the engine speed (plus an optional offset) as shown at 814 in response to the mode change from launch to cruise control.

In order to phase in the D-term, in one example of the present disclosure, the second feedback controller 56 first calculates the allowable derivative gain, as shown at box 70, before calculating the D-term. The allowable derivative gain may be zero, or it may be the lesser of the full derivative gain or the previous derivative gain plus an allowable step. The allowable derivative gain will be zero if the two conditions for phasing in the D-term have not yet been met, as described hereinabove with respect to boxes 102 and 110 in FIG. 6. For example, referring again to FIG. 8, the D-term 808 remains at zero until both (a) the actual vessel speed 800 is within the given range of the desired vessel speed 802, which occurs at dashed line 816, and (b) the acceleration rate 810 is less than a given value. Here, the given value is 0.05 KPH/sec (or substantially zero), and the acceleration rate 810 becomes less than this given value at around 18.5 seconds, as shown by where dashed line 818 intersects acceleration rate 810 (see arrow 820). The allowable derivative gain will be the lesser of the full derivative gain or the previous derivative gain plus an allowable step now that the two conditions for phasing in the D-term have been met. The derivative gain will be ramped in from a starting value of zero to the full derivative gain as described hereinabove.

After the allowable derivative gain is calculated at box 70, it can be multiplied by the rate of change of the vessel speed error in order to determine the D-term. In cruise control mode, the desired vessel speed is constant. Recalling that the derivative of a constant is zero, the rate of change of the vessel speed error can be simplified as follows:

$$\frac{de(t)}{dt} = \frac{d(DS - AS)}{dt} = -\frac{dAS}{dt}$$

where DS is the desired vessel speed (a constant) and AS is the actual vessel speed. Because the derivative of the actual speed is by definition acceleration, the D-term can therefore be determined by multiplying the derivative gain from box 70 by the opposite of the acceleration rate of the vessel, as shown at box 72.

Each of the outputs from boxes 66, 68, and 72 are then added at summer 74. The output of summer 74 is then sent to the engine 42 to adjust throttle position and/or pulse width, as shown at box 64. After the engine's operating conditions have been adjusted, the vessel speed is again read at box 58, and provided to summer 62 to determine the difference from the desired vessel speed, which will not change so long as the vessel remains in cruise control mode. The P and I calculations are performed as before. The derivative gain will change according to the ramp rate and the value of the full derivative gain. The newly calculated derivative gain will again be multiplied by the opposite of the vessel acceleration rate to determine the D-term, which is then sent to summer 74. This process continues until the derivative gain is ramped up to the full derivative gain, which can then thereafter be used while the vessel remains in the cruise control mode. This is shown by the relatively steady rise in the D-term 808 from dashed line 818 until about 22.5 seconds, as derivative gain is ramped in from a starting value of zero to the full derivative gain as described hereinabove. Note that phasing or ramping in of the D-term prevents undershoot of the desired vessel speed 802, as shown at arrow 822. Instead, the actual vessel speed 800 slowly decelerates toward the desired vessel speed 802.

If the desired vessel speed changes at any point in response to movement of the throttle handle 48, a new setpoint value is determined at box 60, and either the full or limited derivative gain will be used as determined at box 70, as appropriate, depending on whether the derivative gain had been fully ramped in before the desired vessel speed changed. For example, after about 22.5 seconds, the vessel decelerates quickly in response to pulling back on the throttle handle 48. Because the D-term had been given time to fully ramp in, it can respond by increasing at a relatively higher rate in order to damp the response of the propulsion system.

In the above description certain terms have been used for brevity, clarity and understanding. No unnecessary limitations are to be implied therefrom beyond the requirement of the prior art because such terms are used for descriptive purposes only and are intended to be broadly construed. The different systems and methods described herein above may be used in alone or in combination with other systems and methods. Various equivalents, alternatives and modifications are possible within the scope of the appended claims. While each of the method claims includes a specific series of steps for accomplishing certain control system functions, the scope of this disclosure is not intended to be bound by the literal order or literal content of steps described herein, and non-substantial differences or changes still fall within the scope of the disclosure.

What is claimed is:

1. A method for controlling a speed of a marine vessel, the method comprising:
    accelerating the marine vessel in response to a launch command; and
    holding the vessel speed at a desired vessel speed with a controller using feedback control;
    wherein the controller phases in a derivative term of the feedback control in response to determining that the following conditions are true:
      a. the vessel speed is within a given range of the desired vessel speed; and
      b. an acceleration rate of the marine vessel is less than a given value.

2. The method of claim 1, wherein the given range varies proportionately with a magnitude of the desired vessel speed.

3. The method of claim 2, wherein the given value is substantially zero.

4. The method of claim 1, further comprising overshooting the desired vessel speed by a predetermined amount and subsequently decelerating the marine vessel to the desired vessel speed.

5. The method of claim 1, further comprising ramping in the derivative term at a predetermined rate with the controller.

6. The method of claim 1, further comprising:
    controlling acceleration of the marine vessel with the controller using a first feedback control algorithm; and
    holding the vessel speed at the desired vessel speed with the controller using a second, different feedback control algorithm.

7. The method of claim 6, wherein the controller uses a difference between a measured vessel speed and the desired vessel speed in order to calculate control terms used in the second feedback control algorithm.

8. A method for controlling a speed of a marine vessel as a propulsion controller of the marine vessel transitions from a launch mode to a cruise control mode, the method comprising:
    determining when the propulsion controller has transitioned from the launch mode to the cruise control mode;
    determining when an acceleration rate of the marine vessel is less than a given value;
    in response to the propulsion controller transitioning from the launch mode to the cruise control mode and the acceleration rate being less than the given value, phasing a derivative term into a feedback control algorithm that the propulsion controller uses to control the vessel speed in the cruise control mode; and
    thereafter maintaining a desired speed of the marine vessel in the cruise control mode with the propulsion controller.

9. The method of claim 8, wherein the propulsion controller transitions from the launch mode to the cruise control mode when the vessel speed is within a given range of the desired vessel speed.

10. The method of claim 9, wherein the given range varies proportionately with a magnitude of the desired vessel speed.

11. The method of claim 10, wherein the given value is substantially zero.

12. The method of claim 8, further comprising ramping the derivative term into the feedback control algorithm at a predetermined rate with the propulsion controller.

13. The method of claim 8, wherein:
   the propulsion controller uses a first feedback control algorithm while in the launch mode; and
   the propulsion controller uses a second, different feedback control algorithm while in the cruise control mode.

14. The method of claim 8, further comprising setting the derivative term to substantially zero in response to the propulsion controller transitioning from the launch mode to the cruise control mode and before phasing in the derivative term.

15. A system for controlling a speed of a marine vessel, the system comprising:
   a first feedback controller controlling the vessel speed while the marine vessel is accelerating according to a launch mode;
   a second feedback controller controlling the vessel speed while the marine vessel is maintaining a desired speed according to a cruise control mode; and
   a propulsion device accepting inputs from the first and second feedback controllers and operating according to the inputs so as to propel the marine vessel in the launch mode or the cruise control mode, respectively;
   wherein the second feedback controller phases in a derivative term in response to a determination that the system has transitioned from the launch mode to the cruise control mode and that an acceleration rate of the marine vessel is less than a given value.

16. The system of claim 15, wherein the system transitions from the launch mode to the cruise control mode in response to the vessel speed being within a given range of the desired vessel speed.

17. The system of claim 16, wherein the given range varies proportionately with a magnitude of the desired vessel speed.

18. The system of claim 15, wherein the given value is substantially zero.

19. The system of claim 15, wherein the second feedback controller ramps in the derivative term from substantially zero to a full derivative term.

20. The system of claim 19, wherein the second feedback controller ramps in the derivative term in calculated increments.

\* \* \* \* \*